United States Patent

[11] 3,604,928

| | | |
|---|---|---|
| [72] | Inventor | Peter Edward Starnes<br>Reading, England |
| [21] | Appl. No. | 714,878 |
| [22] | Filed | Mar. 21, 1968 |
| [45] | Patented | Sept. 14, 1971 |
| [73] | Assignee | Hilger & Watts Limited<br>London, England |

[54] APPARATUS FOR TESTING AND REGULATING THE FLOW OF POWDERED MATERIAL
8 Claims, 1 Drawing Fig.

[52] U.S. Cl. .................................................. 250/43.5, 250/83.3
[51] Int. Cl. .......................................................... G01n 23/12
[50] Field of Search ........................................... 250/43.5 D, 43.5 R, 83.3 D

[56] References Cited
UNITED STATES PATENTS

| 2,914,676 | 11/1959 | Dijkstra et al. ............... | 250/83.3 D |
| 2,958,777 | 11/1960 | Sieswerda et al. ............ | 250/43.5 D |
| 3,011,662 | 12/1961 | Daily ............................ | 250/43.5 D |
| 3,064,357 | 11/1962 | Butters ........................ | 250/43.5 R |
| 3,213,280 | 10/1965 | Burley et al. ................ | 250/43.5 D |

*Primary Examiner*—Archie R. Borchelt
*Attorney*—Cushman, Darby & Cushman

ABSTRACT: Apparatus for testing powdered sample material by radiometric analysis including a sample carrier in the form of a vibratory conveyor, means for forming a layer or ribbon of powdered sample material on said carrier of continuously measured and substantially constant mass per unit area and substantially constant thickness and width, a source of radiation past which said sample layer can be moved by the carrier at a substantially constant distance from said source so as to be irradiated thereby and means for measuring the resultant radiations emanating from the sample material.

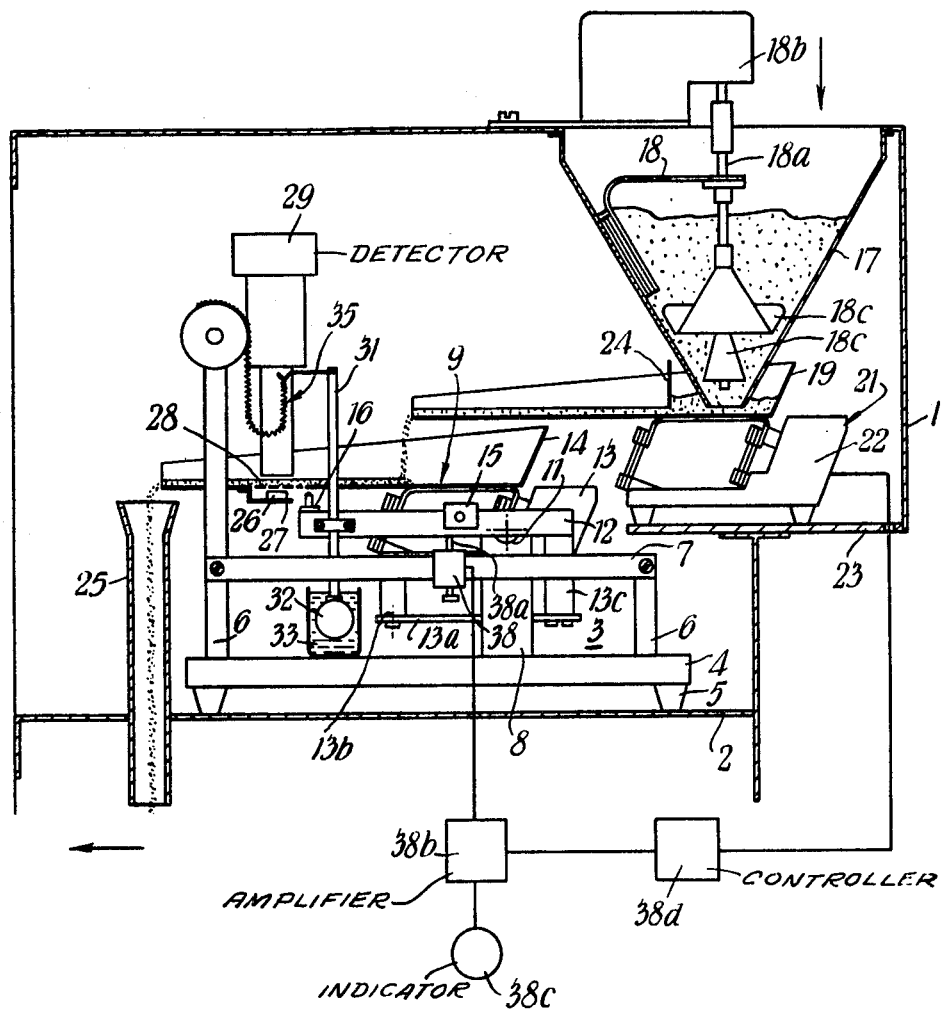

APPARATUS FOR TESTING AND REGULATING THE FLOW OF POWDERED MATERIAL

This invention is concerned with an improved apparatus for the determination of the chemical composition of material by means of radiometric analysis: that is to say by causing a sample of the material which is to be analyzed to interact with an incident beam of radiation of known characteristics, and detecting and measuring the characteristics of resultant radiation or radiations emanating from the sample.

The sample is required to be in the form of a dry powder and may be prepared in this way by a number of suitable known means.

The incident beam of radiation may be in the form of electromagnetic radiation such as X-rays, or corpuscular radiation such as electrons or neutrons, or a mixture of both types of radiation. The resultant radiation emanating from the sample may similarly consist of either or both types of radiation, that is to say, electromagnetic or corpuscular, and it will generally result from transmission of the incident beam through the sample, backscattering of the incident beam by the sample material, the production of characteristic secondary radiation by the excitation of specific atoms of the sample material, or a combination of some or all of these effects.

Such effects are well known in the art and have previously been employed to make accurate quantitative deductions concerning the chemical composition of specially prepared individual samples of compacted material.

In U.S. Pat. No. 3,445,651 the present applicants disclose an apparatus which is primarily characterized by the fact that it includes a movable sample carrier, means for forming a layer or ribbon of powdered sample material on said carrier of continuously measured and substantially constant mass per unit area and substantially constant thickness and width, a source of radiation past which said sample layer can be moved by the carrier at a substantially constant distance from said source so as to be irradiated thereby and means for measuring the resultant radiations emanating from the sample material. Such apparatus will be referred to herein as "Apparatus for testing powdered sample material by radiometric analysis as defined."

A specific embodiment of the apparatus is described in detail in the above specification. The embodiment being characterized by a number of features of design and construction each of which is described fully therein.

Certain of the more important of these features may be summarized as follows:

1. The movable sample carrier is in the form of a rotating disc or turntable carried by a vertical shaft.
2. The vertical shaft is suspended from a knife edge support via a gimbal mounting.
3. The turntable is rotated by a drive transmitted to the vertical shaft through the intermediary of a universal coupling designed to permit the said vertical shaft free vertical and precessional movements within defined limits.

The present invention relates to apparatus which although possessing the primary characteristics of that disclosed in aforesaid specification and enumerated above, is distinguished from the embodiment described in the latter specification by substantial differences of design and construction which represent significant improvements on the earlier disclosures.

The present invention provides apparatus for testing powdered sample material by radiometric analysis as defined, wherein the movable sample carrier is in the form of a vibratory conveyor.

One form of apparatus for testing powdered sample material by radiometric analysis and in accordance with the present invention, will now be described, by way of example, with reference to the accompanying drawing which is a diagrammatic illustration of the apparatus.

Referring to the drawing, the apparatus consists of a main casing 1 having a bottom wall 2 on which is positioned a heavy base plate 4. The latter is mounted on three adjustable legs 5 and carries two posts 6 which in turn support a beam 7. The base 4 also carries two support posts, one of which is shown at 8, on which a vibratory sample carrier assembly 9 is mounted by means of a pivot or fulcrum 11. The vibratory conveyor assembly is composed of a vibratory actuator 13 connected to a sole plate 13a via antivibration mountings one of which is shown at 13b. Said sole plate is rigidly connected to a balance beam 12 by a post 13c. The actuator supports a sample carrier 14 for the sample material being tested.

In order to feed the material being tested onto the sample carrier 14, the apparatus includes a feed hopper 17 depending from an upper wall of the casing 1 and incorporating stirring paddles 18 mounted on a shaft 18a which depends from a drive motor unit 18b. The purpose of the paddle 18 is to agitate the sample and to ensure its free passage through the hopper. The latter discharges onto the sample carrier 19 of a further vibratory conveyor 21 via an antiflooding device 18c which conveyor also incorporates a vibratory actuator 22 by which the carrier 19 is supported. The actuator 22 is mounted on a shelf 23 forming part of the casing 1. As will be apparent from the drawing, the carrier 19 discharges onto the conveyor carrier 14 and the latter itself discharges into an outlet duct 25. In order to cause the material discharge onto the feed conveyor carrier 19 to be fed along the conveyor in a substantially even layer or ribbon, the conveyor 21 incorporates an adjustable gate 24 positioned inside the carrier 19 and disposed transversely of the direction of feed thereof.

For the purposes of making radiation absorption measurements in transmission geometry, the apparatus can incorporate, as shown, an isotope source 26 mounted on a bracket 27 depending from the carrier and a radiation detector 29 mounted above said carrier. Alternatively, for the purposes of making radiation measurements in reflex geometry both the isotope source and the detector can be located below the sample carrier. It should be mentioned that the sample carrier is provided with a thin window of material having a low absorption coefficient for the radiation concerned.

An upright arm 31 is attached to the beam 12 and carries at its lower end a hollow sphere 32. This sphere is immersed in oil in an oil filled damping pot 32 which is supported by the base 4 in order to damp any oscillations imparted to the balance beam 12 by the conveyor carrier 14 and associated actuator 13. The center of gravity of the pivotting system comprising the vibratory conveyor assembly 9, the balance beam 12 and associated components can be adjusted by means of a sliding weight 15 and a chainomatic system 35.

Finally the apparatus includes a weight transducer 38 which may be positioned along the beam 7 and which carries an adjustable contact probe 38a. Said transducer provides an electric signal which is proportional to the downward force exerted upon the probe 38a by the beam 12. Said signal is amplified by an amplifier 38b and is used to provide an indication of the weight of sample carried upon the sample carrier and to control said weight in a manner to be described later. The indicator is referenced 38c and the controller 38d.

Prior to use, the described apparatus is set up as follows. The transducer 38, the sliding weight 15 and the chainomatic system 35 are adjusted so that with both vibratory conveyors vibrating, but with no sample present, the transducer indicator shows a small positive reading.

Annular weights are then added to a stud 16 supported by the beam 12. Said stud is positioned so that a given weight carried by it has an effect upon the transducer equivalent to the same weight of sample material spread over the effective surface of the sample carrier.

When the weights added to the stud are equal to the weight of sample material appropriate to the required measurement, as determined in a manner similar to that described in the above-mentioned specification, the reading of the transducer indicator 38c is noted. The set point of the controller 38d is then adjusted to correspond to said indicator reading, said control system being adapted to control the voltage applied to the vibratory conveyor 21.

The annular weights are then removed from the stud 16 and the apparatus is ready for use.

In use, the hopper is charged with sample material and the paddle 18 and vibratory conveyor assemblies 9 and 21 started up to feed the material through the apparatus. The conveyor speed of the conveyor carrier 19 is automatically controlled so that the mass of material carried by the sample carrier 14, is maintained substantially constant at the predetermined value.

Since the effective area of said sample carrier is known, the mass per unit area of the sample is effectively controlled during its passage over the thin window 28. Also it is found that under the influence of the vibration the thickness of the sample bed remains sensibly constant, so that the bulk density of the sample traversing the window is substantially constant. Under these conditions it is possible to derive accurate analytical information from radiation measurements made as previously described in the aforementioned specification.

It will be appreciated that the use of a vibratory feeder in place of a rotating turntable disclosed in the earlier specification obviates the necessity of providing a complex suspension and driving mechanism such as is disclosed in the above mentioned earlier specification and also eliminates the need to provide a device to spread and smooth the sample material to form an even bed upon the sample carrier.

I claim:

1. Apparatus for testing powdered sample material by radiometric analysis including a movable sample carrier, means for forming a layer or ribbon of powdered sample material on said carrier of continuously measured and substantially constant mass per unit area and substantially constant thickness and width, a source of radiation past which said sample layer can be moved by the carrier at a substantially constant distance from said source so as to be irradiated thereby and means for measuring the resultant radiations emanating from the sample material, wherein the improvement comprises the provision of a vibratory conveyor as the movable sample carrier, said vibratory conveyor is mounted on a fulcrum balance beam and the apparatus includes a weight transducer responsive to the force transmitted by the balance beam and, associated with the transducer, an amplifier and an indicating recording instrument, to provide an indication of the mass of sample material on the conveyor at any one time.

2. Apparatus as claimed in claim 1, wherein the apparatus includes a second vibratory conveyor arranged to feed sample material onto the first mentioned conveyor.

3. Apparatus as claimed in claim 2, including means for controlling the rate of feed of the sample material onto the sample carrier in response to a signal derived from the transducer so as to maintain the weight of sample material on said sample carrier substantially constant.

4. Apparatus as claimed in claim 3, wherein the apparatus includes a feed hopper for receiving the sample material, the hopper being arranged to discharge the material onto the second conveyor.

5. Apparatus as claimed in claim 4, wherein the hopper incorporates a stirring paddle to assist passage of the material through the hopper and an antiflooding discharge device.

6. Apparatus as claimed in claim 3, wherein the second conveyor includes a gate operative to cause the material discharged onto the conveyor to form a layer or ribbon as it passes along the conveyor.

7. Apparatus as claimed in claim 1, wherein the balance beam carries a body immersed in a container of oil to inhibit any tendency of the balance beam to oscillate.

8. Apparatus as claimed in claim 1, wherein the balance beam carries a balance weight mounted for adjustment along the beam and is provided with a chainomatic weight to give a fine weight adjustment.